United States Patent
Abbatiello et al.

(10) Patent No.: US 10,210,519 B2
(45) Date of Patent: Feb. 19, 2019

(54) RISK ANALYSIS BASED ON SOCIAL-NETWORKING INFORMATION

(75) Inventors: Pierpaolo Abbatiello, San Francisco, CA (US); Koi Kit Loh, Dublin (IE)

(73) Assignee: Facebook, Inc., Menlo Park, CA (US)

( * ) Notice: Subject to any disclaimer, the term of this patent is extended or adjusted under 35 U.S.C. 154(b) by 289 days.

(21) Appl. No.: 13/567,279

(22) Filed: Aug. 6, 2012

(65) Prior Publication Data

US 2014/0040086 A1    Feb. 6, 2014

(51) Int. Cl.
    G06Q 40/00    (2012.01)
    G06Q 20/40    (2012.01)
    G06Q 40/02    (2012.01)
    G06Q 50/00    (2012.01)

(52) U.S. Cl.
    CPC ......... *G06Q 20/4016* (2013.01); *G06Q 40/02* (2013.01); *G06Q 50/01* (2013.01)

(58) Field of Classification Search
    USPC .................................................. 705/35–40
    See application file for complete search history.

(56) References Cited

U.S. PATENT DOCUMENTS

| | | | | |
|---|---|---|---|---|
| 8,316,086 | B2 * | 11/2012 | Ufford | G06Q 10/107 705/319 |
| 2010/0205430 | A1 * | 8/2010 | Chiou | G06Q 10/10 713/156 |
| 2012/0143761 | A1 * | 6/2012 | Doran | G06Q 20/08 705/44 |
| 2012/0159647 | A1 * | 6/2012 | Sanin | H04L 51/32 726/28 |
| 2013/0085877 | A1 * | 4/2013 | Ruhrig | G06Q 20/02 705/21 |

OTHER PUBLICATIONS

Dongsheng, Zhai; "A social network based trust model for e-commerce"; Wireless Communications, Networking and Mobile Computing, 2008. WiCOM '08.4th International Conference on; DOI: 10.1109/WiCom.2008.2144 Publication Year: 2008 , pp. 1-5.*
Fengming, Liu; "Social network-based trust computing in P2P environnnents";Intelligent Control and Automation, 2008. WCICA 2008 . 7th World Congress on; DOI: 10.1109/WCICA.2008. 4593253 Publication Year: 2008 , pp. 2130-2135.*

* cited by examiner

*Primary Examiner* — Olabode Akintola
(74) *Attorney, Agent, or Firm* — Baker Botts L.L.P.

(57) ABSTRACT

In one embodiment, accessing information associated with a financial activity conducted by a user who belongs to a social network; determining one or more social connections of the user within the social network; and determining legitimacy of the user using the information in connection with the financial activity based on the one or more social connections of the user.

12 Claims, 4 Drawing Sheets

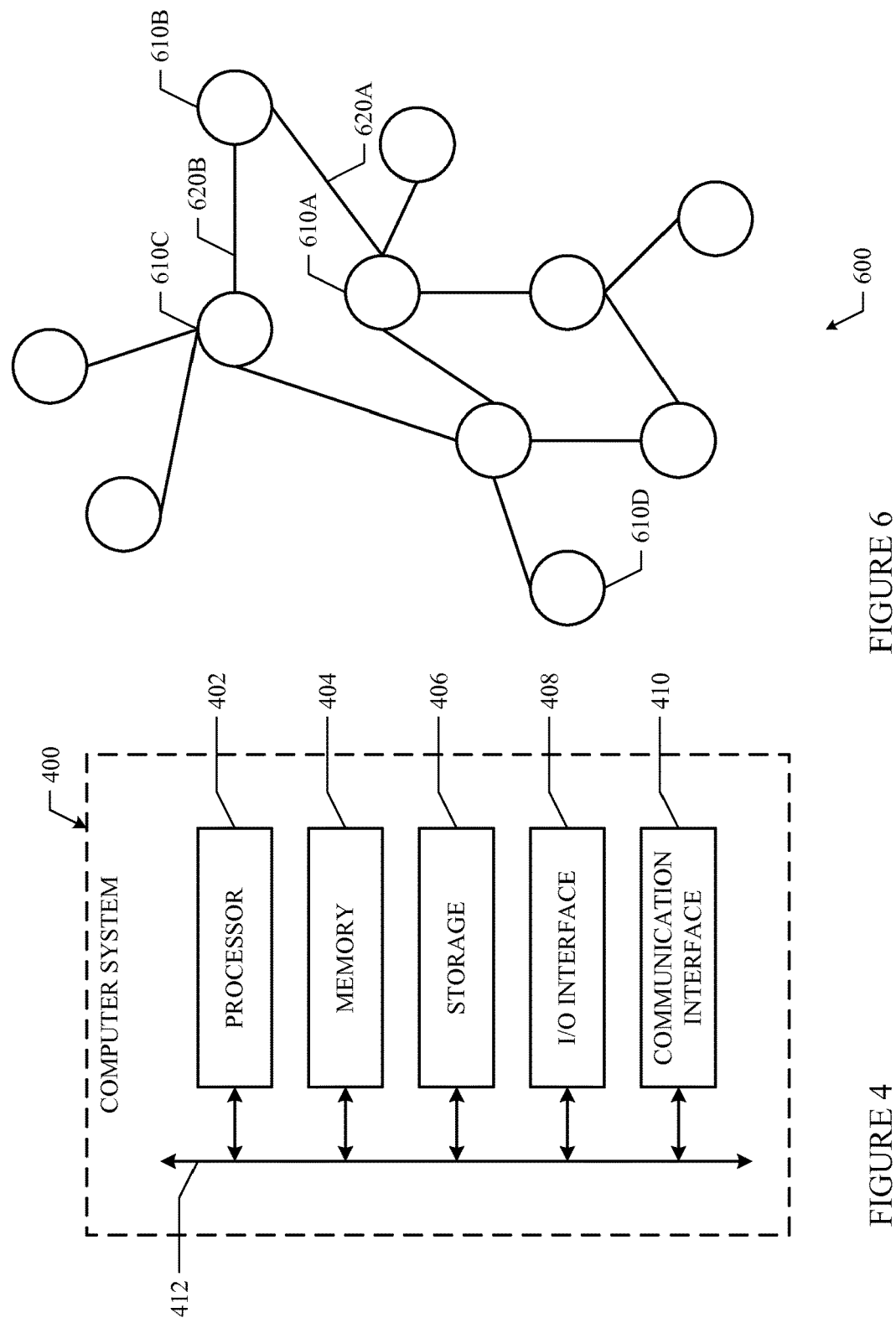

RISK ANALYSIS BASED ON SOCIAL-NETWORKING INFORMATION

TECHNICAL FIELD

This disclosure generally relates to risk analysis in the context of financial transactions.

BACKGROUND

Electronic commerce, commonly known as e-commerce or e-comm, is conducting financial transactions, such as the buying and selling of products or services, over electronic systems, such as the Internet or other computer networks. With the advancement of computer and communication networks as well as the popularization of personal electronic devices, more and more people take the advantage and convenience of conducting business online. On the other hand, there are opportunities for criminals to perpetrate fraud or other illegal activities during such online financial transactions, especially since such transactions are not conducted in person.

BRIEF DESCRIPTION OF THE DRAWINGS

FIG. 4 illustrates an example computing or electronic device.

FIG. 6 illustrates an example graph that represents information associated or contained in a social-networking system.

DESCRIPTION OF EXAMPLE EMBODIMENTS

Figure 1:
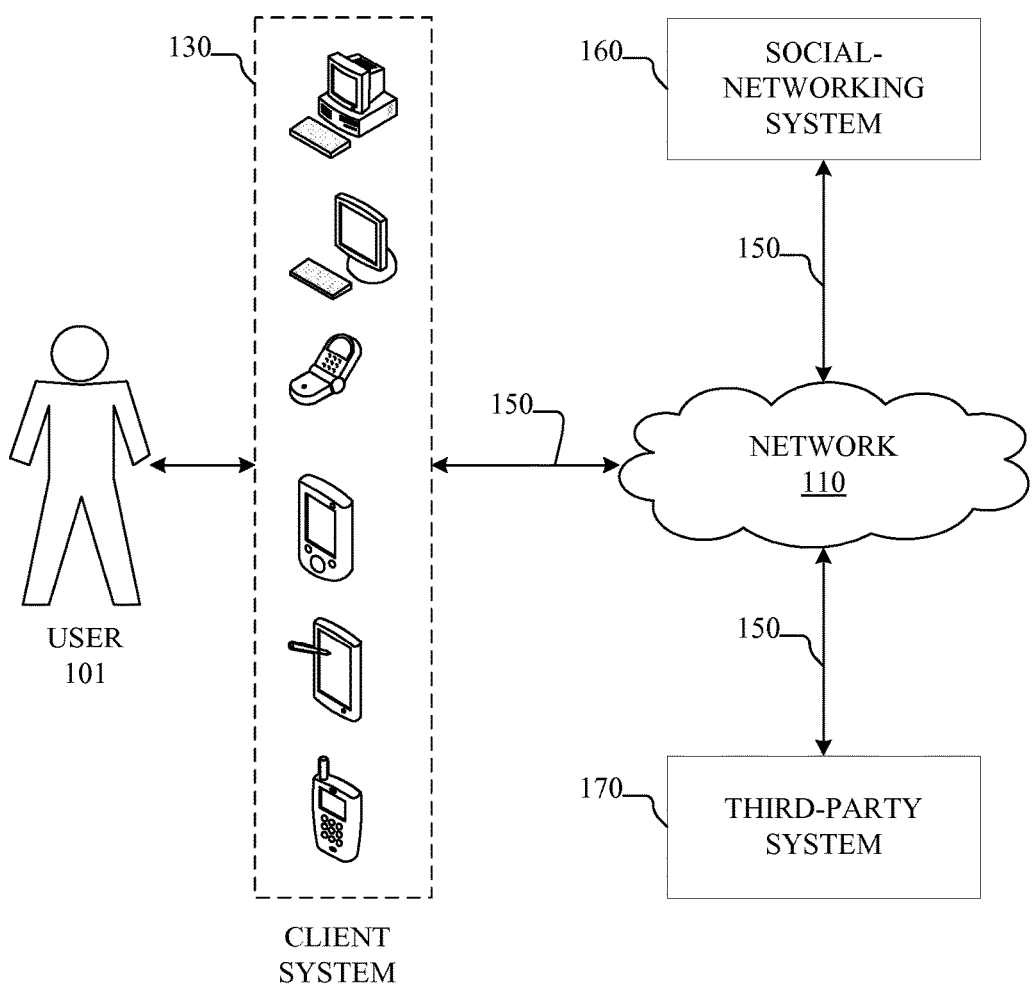
FIG. 1 illustrates an example network environment associated with a social-networking system.

In particular embodiments, risk analysis in the context of financial transactions is performed by taking into consideration certain social-networking information. More specifically, when information, which may potentially be associated with or is associated with a financial transaction, is shared among multiple users, the existence or the lack of social connections among these users within a social network are used to help determine whether there may be fraud or other types of illegal activities perpetrated in connection with the usage of the information.

Conducting financial transactions over computer networks, such as the Internet, is becoming increasingly popular. Unfortunately, it also creates opportunities for criminals to perpetrate fraud and other illegal activities, partly due to the fact that the parties to these transactions are often strangers located in different geographical regions. As an example, criminals often steal credit card account information and then use the stolen credit cards to purchase goods online, which results in great financial losses to both the card owners as well as the credit card companies that issue these cards. Consequently, credit card companies or other parties facilitating online financial transactions (e.g., websites selling products or services) often monitor the behavioral patterns of credit card users to determine whether specific card usages are legitimate (e.g., by actual and true account owners) or fraudulent (e.g., by criminals). For example, if a credit card, whose true owner lives in the United States, is suddenly used to purchase expensive goods in a foreign country and there is no indication that the true card owner has travelled to that foreign country, it may be an indication that the credit card information has been stolen and the foreign-country transaction is fraudulent and conducted by a thief who has stolen the credit card information. In this case, the credit card company may block the transaction in question, at least until the true card owner can be contacted to verify the transaction.

In some cases, however, legitimate card usages may resemble fraudulent behavioral patterns. For example, when information of a credit card account is stolen, the account information is often passed among many criminals so that many criminals can use the same credit card account to make many purchases. In this case, if the same credit card account is shared and used by multiple people, it may suggest that the transactions made with this credit card account are fraudulent. On the other hand, in certain regions around the world (e.g., in countries where credit cards are not yet popular), sometimes friends or families may share a single credit card account for use during online transactions. In this case, the true account owner has authorized her friends or families to use her credit card account, and yet, on the surface, such activities of sharing the same credit card account among families or friends are very similar to criminals sharing the same stolen credit card account. The credit card company may block these legitimate transactions as a result.

In particular embodiments, information available to a social network (e.g., information about its users and their social connections) may be used to help distinguish legitimate online transactions from fraudulent ones.

A social network, in general, is a social structure made up of entities, such as individuals or organizations, that are connected by one or more types of interdependency or relationships, such as friendship, kinship, common interest, financial exchange, dislike, or relationships of beliefs, knowledge, or prestige. In more recent years, social networks have taken advantage of the Internet. There are social-networking systems existing on the Internet in the form of social-networking websites. Such social-networking websites enable their members, who are commonly referred to as website users, to perform various social activities. For example, the social-networking website operated by Facebook, Inc. at www.facebook.com enables its users to establish social connections (e.g., often referred to as "friends"), communicate with their friends via emails, instant messages, or blog postings, organize social events, share photos, receive news of their friends or interesting events, play games, organize events, etc.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host various application, including online financial transactions. Third-party system 170 may generate, store, receive, and transmit financial information, such as, for example, credit card or other payment information. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Figure 5:
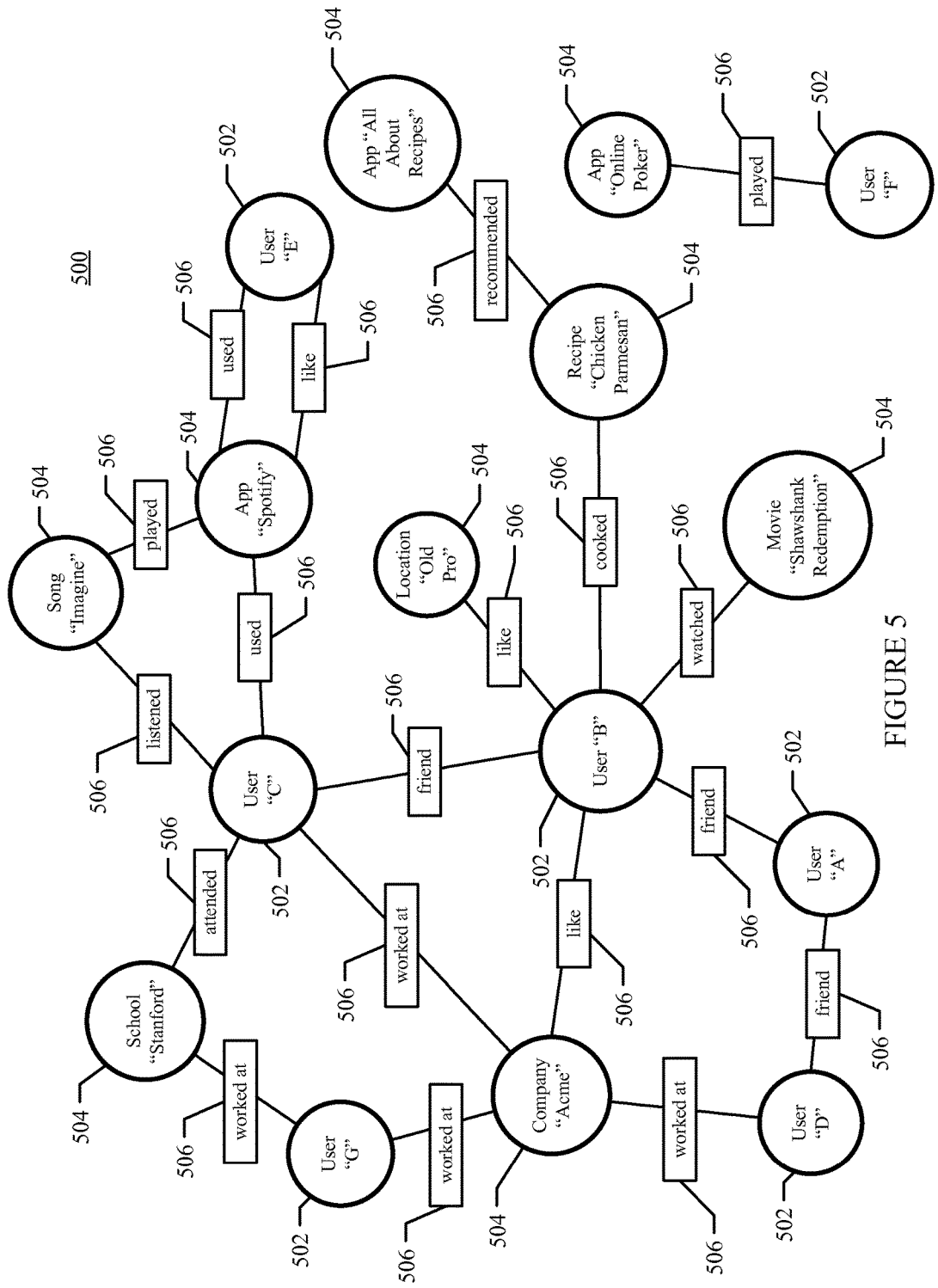
FIG. 5 illustrates an example social graph.

A social-networking system may contain a vast amount of information related to its users. Such information includes but is not limited to the social connections of the individual users. In addition, it may include, for example and without limitation, demographical information, network or social activities, behavior profiles, and personal preferences, interests, or hobbies of the individual users. Particular embodiments may represent the information contained in a social-networking system using a graph that may have any number of nodes and edges, an example of which is illustrated in FIG. 5. Such a graph may sometimes be referred to as a "social graph".

FIG. 5 illustrates example social graph 500. In particular embodiments, social-networking system 160 may store one or more social graphs 500 in one or more data stores. In particular embodiments, social graph 500 may include multiple nodes—which may include multiple user nodes 502 or multiple concept nodes 504—and multiple edges 506 connecting the nodes. Example social graph 500 illustrated in FIG. 5 is shown, for didactic purposes, in a two-dimensional visual map representation. In particular embodiments, a social-networking system 160, client system 130, or third-party system 170 may access social graph 500 and related social-graph information for suitable applications. The nodes and edges of social graph 500 may be stored as data objects, for example, in a data store (such as a social-graph database). Such a data store may include one or more searchable or queryable indexes of nodes or edges of social graph 500.

In particular embodiments, a user node 502 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 502 corresponding to the user, and store the user node 502 in one or more data stores. Users and user nodes 502 described herein may, where appropriate, refer to registered users and user nodes 502 associated with registered users. In addition or as an alternative, users and user nodes 502 described herein may, where appropriate, refer to users that have not registered with social-networking system 160. In particular embodiments, a user node 502 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 502 may be associated with one or more data objects corresponding to information associated with a user. In particular embodiments, a user node 502 may correspond to one or more webpages or one or more user-profile pages (which may be webpages).

In particular embodiments, a concept node 504 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 504 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 504 may be associated with one or more data objects corresponding to information associated with concept node 504. In particular embodiments, a concept node 504 may correspond to a webpage.

In particular embodiments, a node in social graph 500 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 504. Profile pages may be viewable by all or a selected subset of other users. As an example and not by way of limitation, a user node 502 may have a corresponding user-profile page in which the corresponding user may add content, make declarations, or otherwise express himself or herself. As another example and not by way of limitation, a concept node 504 may have a corresponding concept-profile page in which one or more users may add content, make declarations, or express themselves, particularly in relation to the concept corresponding to concept node 504.

In particular embodiments, a concept node 504 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 502 corresponding to the user and a concept node 504 corresponding to the third-party webpage or resource and store edge 506 in one or more data stores.

In particular embodiments, a pair of nodes in social graph 500 may be connected to each other by one or more edges 506. An edge 506 connecting a pair of nodes may represent a relationship between the pair of nodes. In particular embodiments, an edge 506 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 506 connecting the first user's user node 502 to the second user's user node 502 in social graph 500 and store edge 506 as social-graph information in one or more of data stores 24. In the example of FIG. 5, social graph 500 includes an edge 506 indicating a friend relation between user nodes 502 of user "A" and user "B" and an edge indicating a friend relation between user nodes 502 of user "C" and user "B." Although this disclosure describes or illustrates particular edges 506 with particular attributes connecting particular user nodes 502, this disclosure contemplates any suitable edges 506 with any suitable attributes connecting user nodes 502. As an example and not by way of limitation, an edge 506 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 500 by one or more edges 506.

In particular embodiments, an edge 506 between a user node 502 and a concept node 504 may represent a particular action or activity performed by a user associated with user node 502 toward a concept associated with a concept node 504. As an example and not by way of limitation, as illustrated in FIG. 5, a user may "like," "attended," "played," "listened," "cooked," "worked at," or "watched" a concept, each of which may correspond to a edge type or subtype. A concept-profile page corresponding to a concept node 504 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 506 and a "used" edge (as illustrated in FIG. 5) between user nodes 502 corresponding to the user and concept nodes 504 corresponding to the song and application to indicate that the user listened to the song and used the application. Moreover, social-networking system 160 may create a "played" edge 506 (as illustrated in FIG. 5) between concept nodes 504 corresponding to the song and the application to indicate that the particular song was played by the particular application. In this case, "played" edge 506 corresponds to an action performed by an external application (SPOTIFY) on an external audio file (the song "Imagine"). Although this disclosure describes particular edges 506 with particular attributes connecting user nodes 502 and concept nodes 504, this disclosure contemplates any suitable edges 506 with any suitable attributes connecting user nodes 502 and concept nodes 504. Moreover, although this disclosure describes edges between a user node 502 and a concept node 504 representing a single relationship, this disclosure contemplates edges between a user node 502 and a concept node 504 representing one or more relationships. As an example and not by way of limitation, an edge 506 may represent both that a user likes and has used at a particular concept. Alternatively, another edge 506 may represent each type of relationship (or multiples of a single relationship) between a user node 502 and a concept node 504 (as illustrated in FIG. 5 between user node 502 for user "E" and concept node 504 for "SPOTIFY").

In particular embodiments, social-networking system 160 may create an edge 506 between a user node 502 and a concept node 504 in social graph 500. As an example and not by way of limitation, a user viewing a concept-profile page (such as, for example, by using a web browser or a special-purpose application hosted by the user's client system 130) may indicate that he or she likes the concept represented by the concept node 504 by clicking or selecting a "Like" icon, which may cause the user's client system 130 to transmit to social-networking system 160 a message indicating the user's liking of the concept associated with the concept-profile page. In response to the message, social-networking system 160 may create an edge 506 between user node 502 associated with the user and concept node 504, as illustrated by "like" edge 506 between the user and concept node 504. In particular embodiments, social-networking system 160 may store an edge 506 in one or more data stores. In particular embodiments, an edge 506 may be automatically formed by social-networking system 160 in response to a particular user action. As an example and not by way of limitation, if a first user uploads a picture, watches a movie, or listens to a song, an edge 506 may be formed between user node 502 corresponding to the first user and concept nodes 504 corresponding to those concepts. Although this disclosure describes forming particular edges 506 in particular manners, this disclosure contemplates forming any suitable edges 506 in any suitable manner.

FIG. 6 illustrates another, somewhat simplified example of social graph 600. In graph 600 illustrated in FIG. 6, each node may represent an entity, which may be human (e.g., user of the social-networking system) or non-human (e.g., location, event, action, business, object, message, post, image, web page, news feed, etc.). Two nodes are connected with an edge if the two nodes are related in some way (i.e., there is a relationship between the two nodes). Example cases when two nodes in graph 600 may be related and thus connected with an edge may include, without limitation, (1) the two nodes represent two users of a social-networking system respectively, and these two users are socially connected (e.g., friends of each other); (2) the two nodes represent a user of the social-networking system and an event respectively, and the user has attended the event; (3) the two nodes represent a user of the social-networking system and a location respectively, and the user has been to the location; (4) the two nodes represent a user of the social-networking system and a web page respectively, and the user has interacted with (e.g., viewed) the web page; (5) the two nodes represent an event and a location respectively, and the event is held at the location; (6) the two nodes represent a user of the social-networking system and an image (e.g., a digital photograph) respectively, and the user is in the image or the user has posted the image; (7) the two nodes represent a user of the social-networking system and a product (e.g., a mobile telephone) respectively, and the user owns and uses the product; and (8) the two nodes represent a user of the social-networking system and a software application (e.g., a web-based game) respectively, and the user uses the application (e.g., plays the game). A connection may exist between two humans, a human and a non-human entity, and two non-human entities. Any type of relationship between two human or non-human entities may result in a connection between the two entities.

In graph 600, when there is an edge between two specific nodes, the two nodes may be considered directly related. For example, edge 620A connects nodes 610A and 610B, and thus nodes 610A and 610B are directly related. Similarly, edge 620B connects nodes 610B and 610C, and thus nodes 610B and 610C are directly related. When there is no edge between two particular nodes, the two nodes may still be considered indirectly related. For example, there is no edge directly connecting nodes 610A and 610C; however, nodes 610A and 610C may still be considered indirectly related through node 610B.

With respect to node 610A, node 610B has a closer relationship to it than node 610C, because in graph 600, it takes one hop to go from node 610A to node 610B, but it takes two hops to go from node 610A to node 610C (e.g., through node 610B). In particular embodiments, with respect to two specific nodes, the less number of hops it takes to go from one node to another node, the closer the two nodes are related. Thus, a graph such as graph 600 may indicate, among others, how closely two users are socially connected.

Figures 2, 3:
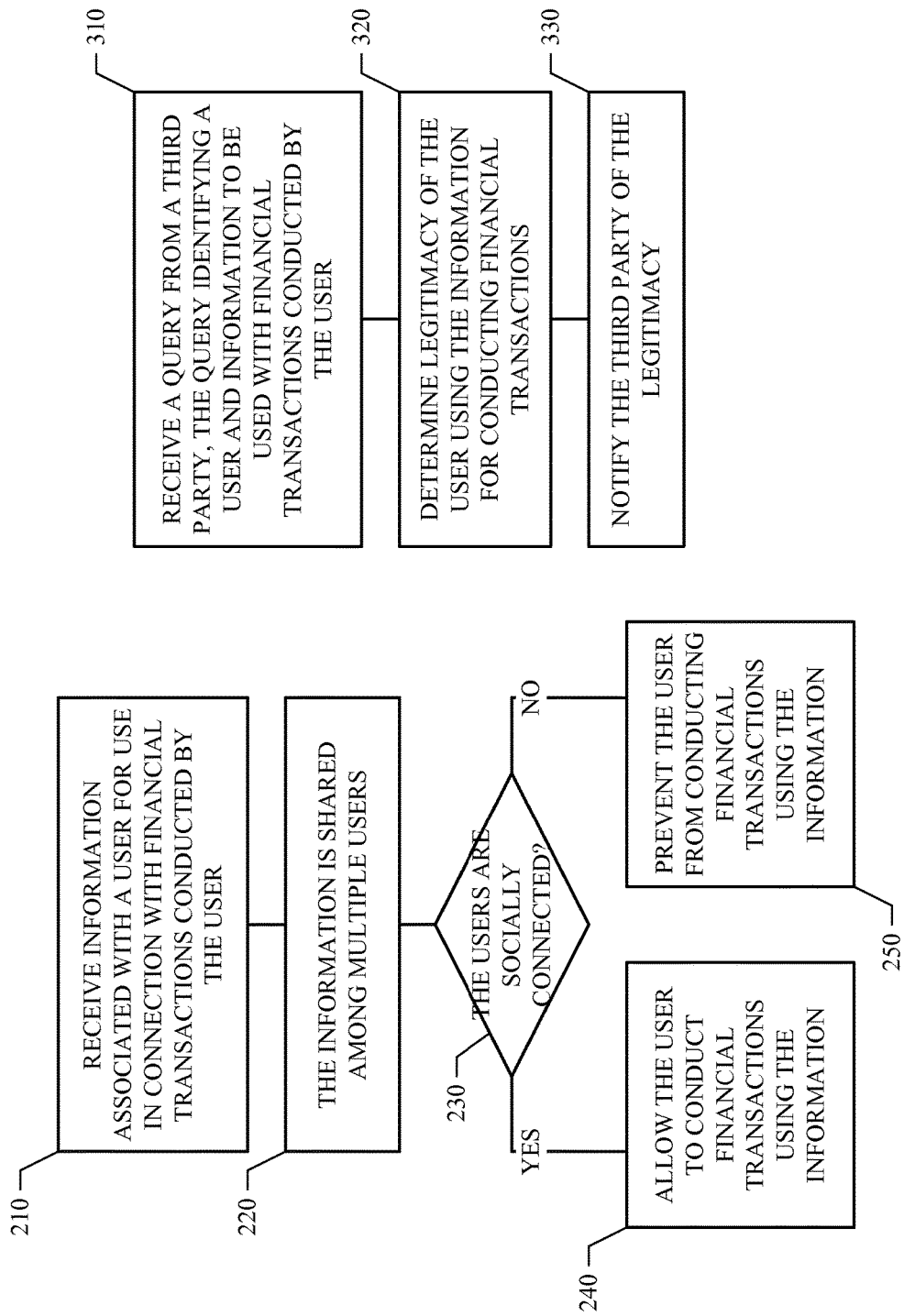
FIG. 2 illustrates an example method for performing risk analysis based on social-networking information.
FIG. 3 illustrates an example method for performing risk analysis on behalf of third parties.

Social connections among users of a social network, as indicated by a social graph (e.g., graph 600), may be used when performing risk analysis for financial transactions. FIG. 2 illustrates an example method for performing risk analysis based on social-networking information.

In particular embodiments, at step 210, information may be received (e.g., at a social-networking system). This information may be connected with a specific user (e.g., User A) to be used in one or more financial transactions conducted by User A. As an example, the information may be a payment method, such as a credit card account or a PayPal account, which is to be used to pay for the products or services to be purchased by User A. As another example, the information may identify an electronic device, such as a computer, with which User A performs the financial transactions online.

With some implementations, a credit card account may be identified by its unique account number. A PayPal account may be identified by its unique login name. An electronic device may be identified by one or more cookies stored on that device. A cookie, also known as an HTTP cookie, web cookie, or browser cookie, is usually a small piece of data sent from a website (e.g., a social-networking website) and stored in a web browser executing on a user's electronic device while the user is browsing the website. Unique cookies may be sent to and stored in web browsers executing on different machines so that subsequently, the machines may be individually identified by the specific cookies stored in the web browsers on these machines.

In particular embodiments, at step 220, it may be determined that multiple users, including User A, share the same information when conducting financial transactions (e.g., purchasing products or services online). For example, the same payment method (e.g., credit card account) may be shared among multiple users to purchase products or services online. Or, the same electronic device may be used by multiple users to conduct financial transactions online. This may raise an alert as such sharing may indicate fraudulent activities.

In particular embodiments, at step 230, social connections within a social network may be examined to determine whether these users, who share the same information, are socially connected. First, it may be determined whether these users all belong to the same social network. If one or more of these users do not belong to a social network, then there is no social connection between such users, at least according to the information available to the social network. If all users belong to the same social network, then the existence or lack of social connections among these users within the social network may be examined.

With some implementations, given a set of users sharing the same information (e.g., a payment method or an electronic device), if each user in the set is directly connected with at least one other user in the set in the social network (e.g., according to the social graph), then the set of users is considered to be socially connected. For example, in graph 600, the three users represented by nodes 610A, 610B, and 610C are considered socially connected because both nodes 610A and 610C are directly connected with node 610B despite the fact that there is no direct connection between nodes 610A and 610C. On the other hand, the three users represented by nodes 610A, 610B, and 610D are not considered socially connected because node 610D is not directly connected with either node 610A or node 610B.

In particular embodiments, when the multiple users, including User A, who share the same information are socially connected, at step 240, User A is allowed to conduct financial transactions using the information (e.g., payment method or electronic device). On the other hand, when the multiple users, including User A, who share the same information are not socially connected, at step 250, User A is blocked from conducting the financial transactions using the information, at least until further verifications may be made through other appropriate channels.

In particular embodiments, when performing risk analysis based on social information, the result may take various forms. As an example, the analysis may produce a binary result. Either the user's usage of the information is legitimate or illegitimate. As another example, the analysis may produce a probability value (e.g., the user's usage of the information is 85% legitimate or 40% legitimate, etc.).

To further explain the steps illustrated in FIG. 2, consider a specific example. Suppose that a user, User A, creates a user account with a social-networking system. User A then attempts add a payment account (e.g., credit card or PayPal account) to his user account. At this point, the social-networking system may perform risk analysis to determine whether User A's usage of the payment account is likely to be legitimate. Suppose that the social-networking system determines that the same payment account has already been added to three other accounts associated with three other users, User B, User C, and User D respectively, in the social-networking system. The social-networking system may determine whether Users A, B, C, and D are socially connected (e.g., whether each of the four users in the group is directly connected with at least one other user in the group). If so, the social-networking system may allow User A to add the payment account to his user account. Otherwise, User A may be prevented from adding the payment account to his user account.

In addition, suppose that some time later, User A needs to make a payment for some products or services and specifies the payment account for this payment. At this point, the social-networking system may again perform risk analysis to determine whether User A's usage of the payment account is likely to be legitimate. Suppose that the same payment account has already been used by three other users, User B, User C, and User D, to make various payments. The social-networking system may determine whether Users A, B, C, and D are socially connected. If so, the social-networking system may allow User A to use the payment account. Otherwise, User A may be blocked for making the payment using the payment account.

In particular embodiments, in addition to social connections, other types of information may also help with the risk analysis. For example, suppose again that Users A, B, C, and D share the same payment account. If Users A, B, C, and D all share the same surname as the surname on the payment account, this may be an indication that Users A, B, C, and D are members of the same family, which in turn suggests that their usage of the same payment account is legitimate.

Consider another specific example. Suppose that the same computer (e.g., as identified by cookies stored on the computer) is used to access four user accounts belonging to four different users (e.g., Users A, B, C, and D) at the social-networking system. In other words, several users share the same computer. On the one hand, several friends or family members may legitimately share a computer. On the other hand, the computer may have been stolen and is now used by several criminals. Again, the existence or lack of social connections among the four users sharing the computer in the social-networking system may be determined. If the four users are socially connected, it may be an indication that the sharing of the computer is legitimate.

Consider a third example. Suppose that criminals have hacked into a legitimate user account at the social-networking system and there is a payment account already added to this compromised user account. Thereafter, several criminals use the payment account to pay for products or services. Since these criminals are likely to access the compromised user account through their own computers, the cookies on their machines may indicate that the user account is now accessed from many machines not normally used by the true owner of the account. This may indicate to the social-networking system that this user account has been compromised.

In particular embodiments, the social-networking system may help third parties involved in financial transactions online (e.g., credit card companies, websites, etc.) perform risk analysis. FIG. 3 illustrates an example method for performing risk analysis on behalf of third parties.

In particular embodiments, at step 310, the social-networking system may receive a query from a third party involved in a financial transaction (e.g., a credit card company or an e-commerce website). The query may identify a user and information (e.g., a payment account) to be used with a financial transaction conducted by the user. At step 320, the social-networking system may determine the legitimacy of the user's usage of the information for conducting the financial transaction (e.g., based on social connections of the user as described above in connection with FIG. 2). At step 330, the social-networking system may notify the third party the result of its risk analysis.

Particular embodiments may be implemented on one or more computer systems. For example, the steps illustrated in FIGS. 2 and 3 may be implemented as computer software and executed on one or more computer systems. FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 400 may include one or more computer systems 400; be unitary or distributed; span multiple locations; span multiple machines; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include an HDD, a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, reference to a computer-readable non-transitory storage medium may include a semiconductor-based or other integrated circuit (IC) (such, as for example, a field-programmable gate array (FPGA) or an application-specific IC (ASIC)), a hard disk drive ("HDD"), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable non-transitory storage medium or a suitable combination of these, where appropriate. This disclosure contemplates one or more computer-readable storage media implementing any suitable storage. In particular embodiments, a computer-readable storage medium implements one or more portions of processor 402 (such as, for example, one or more internal registers or caches), one or more portions of memory 404, one or more portions of storage 406, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA, C, or C++. In particular embodiments, software is expressed in HyperText Markup Language (HTML), Extensible Markup Language (XML), or other suitable markup language.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computing device, receiving a first indication that a first financial transaction has occurred, the first indication comprising:
      an identity of a first social-networking user, the first social-networking user being represented by a first user node in a social graph of a social-networking system,
      an identifier of a payment account used for conducting the first financial transaction; and
      a first cookie associated only with a first computing device of the first social-networking user;
   by the computing device, providing instructions to store the identity of the social-networking user, the identifier, and the cookie in a data cache associated with the computing device, the data cache comprising a list of identities of a plurality of other social-networking users who have previously used the payment account;
   by the computing device, receiving a second indication that a second financial transaction has occurred, the second indication comprising:
      an identity of a second social-networking user, the second social-networking user being represented by a second user node in the social graph;
      the identifier of the payment account used for conducting the first financial transaction; and
      a second cookie associated only with a second computing device not normally associated with the first social-networking user; and
   by the computing device, determining that the second financial transaction is fraudulent based at least in part on a determination that (1) the second cookie is not normally associated with the first computing device, and (2) a direct social-graph connection does not exist between the first user node and the second user node in the social graph.

2. The method of claim 1, wherein one or more other social-networking users are socially connected within the social network, wherein each user node associated with each of the one or more other social-networking users is directly connected with at least one other user node associated with one of the one or more other social-networking users.

3. The method of claim 1, further comprising, by the computing device, blocking the financial transaction.

4. The method of claim 1, wherein the payment account used for conducting the financial transaction is a credit card account.

5. The method of claim 1, wherein:
   the first indication further comprises an identifier of an electronic device used by the social-networking user for conducting the financial transaction; and
   the electronic device has previously been used by the second social-networking user for conducting the one or more other financial transactions.

6. One or more computer-readable non-transitory storage media embodying logic that is operable when executed to:
   receive a first indication that a first financial transaction has occurred, the first indication comprising:
      an identity of a first social-networking user, the first social-networking user being represented by a first user node in a social graph of a social-networking system,
      an identifier of a payment account used for conducting the first financial transaction; and
      a first cookie associated only with a first computing device of the first social-networking user;
   provide instructions to store the identity of the social-networking user, the identifier, and the cookie in a data cache associated with the computing device, the data cache comprising a list of identities of a plurality of other social-networking users who have previously used the payment account;
   receive a second indication that a second financial transaction has occurred, the second indication comprising:
      an identity of a second social-networking user, the second social-networking user being represented by a second user node in the social graph;
      the identifier of the payment account used for conducting the first financial transaction; and
      a second cookie associated only with a second computing device not normally associated with the first social-networking user; and
   determine that the second financial transaction is fraudulent based at least in part on a determination that (1) the second cookie is not normally associated with the first computing device, and (2) a direct social-graph connection does not exist between the first user node and the second user node in the social graph.

7. The media of claim 6, wherein one or more other social-networking users are socially connected within the social network, wherein each user node associated with each of the one or more other social-networking users is directly connected with at least one other user node associated with one of the one or more other social-networking users.

8. The media of claim 6, wherein the logic is further operable when executed to block the financial transaction.

9. The media of claim 6, wherein the payment account used for conducting the financial transaction is a credit card account.

10. The media of claim 6, wherein:
the first indication further comprises an identifier of an electronic device used by the social-networking user for conducting the financial transaction; and
the electronic device has previously been used by the second social-networking user for conducting the one or more other financial transactions.

11. A computing device comprising:
a memory comprising instructions executable by one or more processors; and
the one or more processors coupled to the memory and operable to execute the instructions, the one or more processors being operable when executing the instructions to:
receive a first indication that a first financial transaction has occurred, the first indication comprising:
an identity of a first social-networking user, the first social-networking user being represented by a first user node in a social graph of a social-networking system,
an identifier of a payment account used for conducting the first financial transaction; and
a first cookie associated only with a first computing device of the first social-networking user;
provide instructions to store the identity of the social-networking user, the identifier, and the cookie in a data cache associated with the computing device, the data cache comprising a list of identities of a plurality of other social-networking users who have previously used the payment account;
receive a second indication that a second financial transaction has occurred, the second indication comprising:
an identity of a second social-networking user, the second social-networking user being represented by a second user node in the social graph;
the identifier of the payment account used for conducting the first financial transaction; and
a second cookie associated only with a second computing device not normally associated with the first social-networking user; and
determine that the second financial transaction is fraudulent based at least in part on a determination that (1) the second cookie is not normally associated with the first computing device, and (2) a direct social-graph connection does not exist between the first user node and the second user node in the social graph.

12. The computing device of claim 11, wherein the payment account used for conducting the financial transaction is a credit card account.

\* \* \* \* \*